United States Patent Office 3,733,189
Patented May 15, 1973

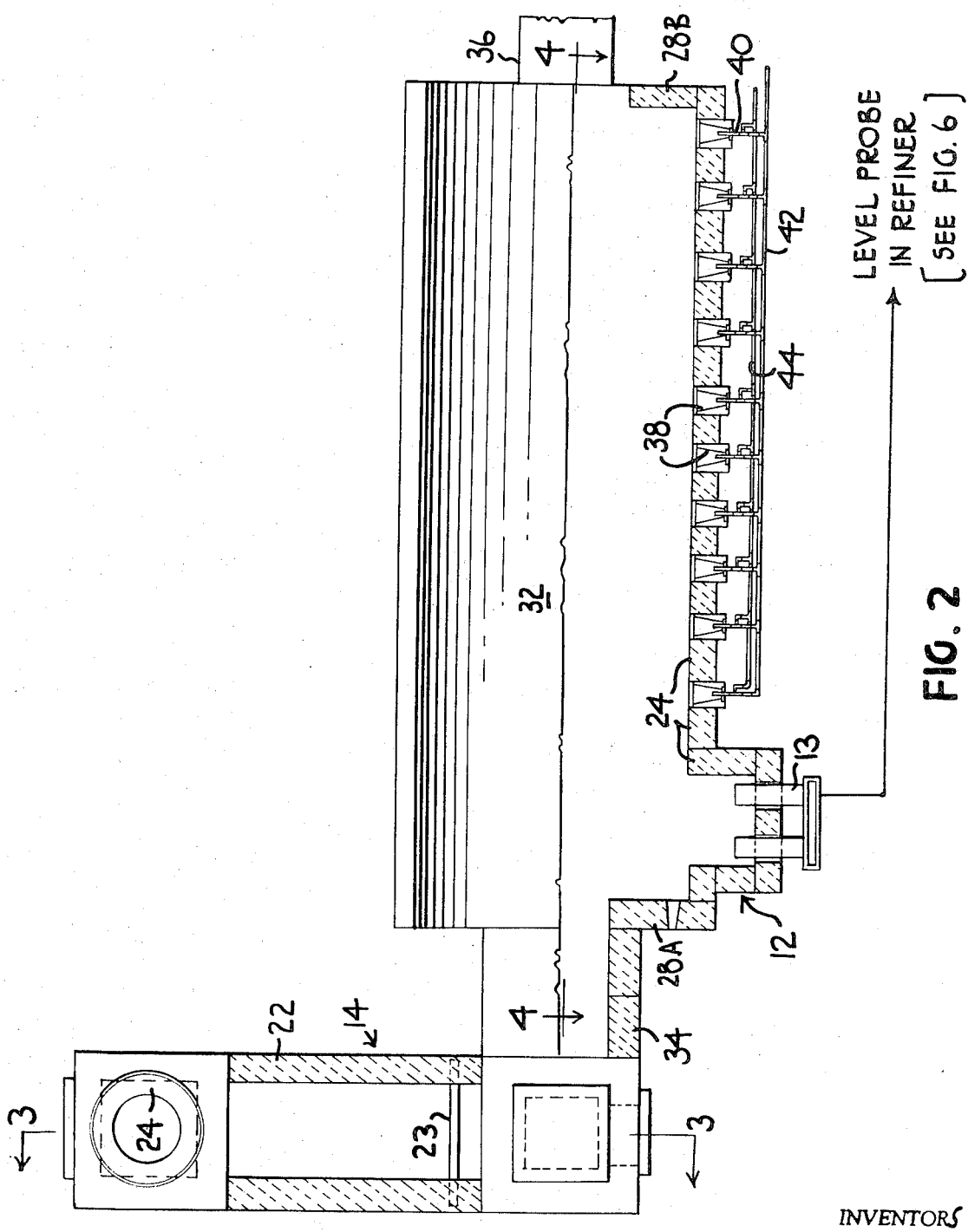

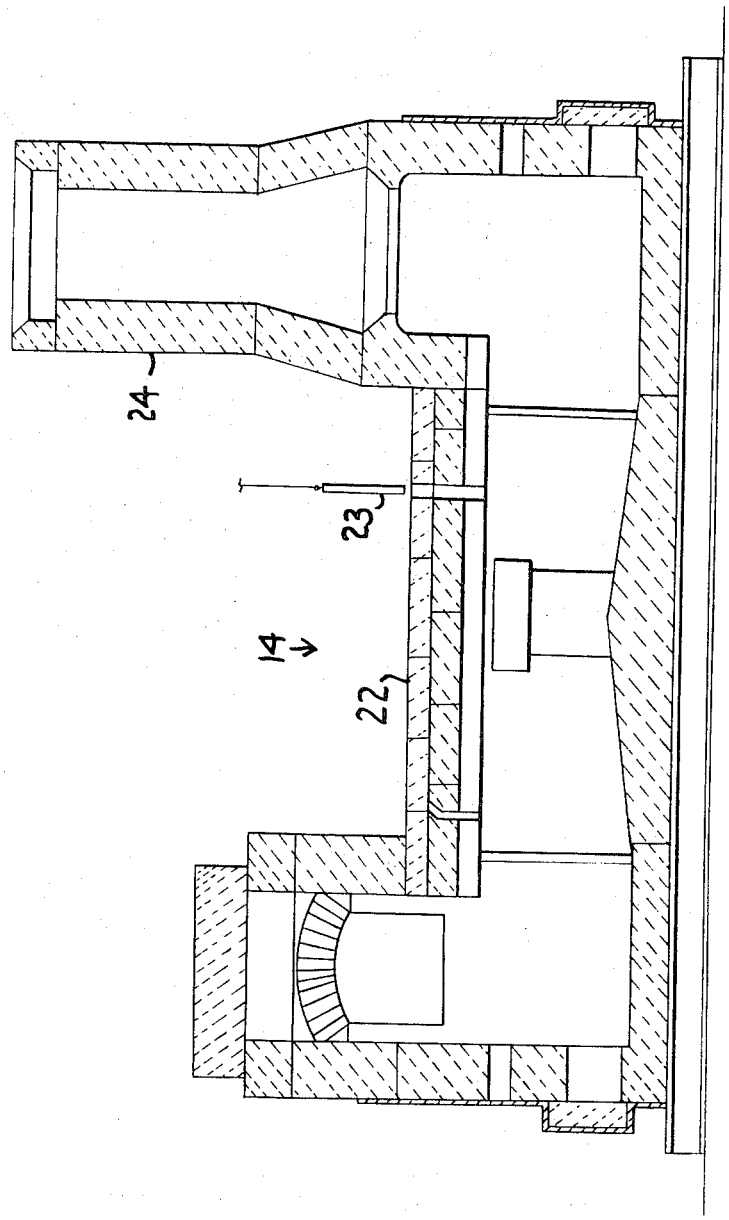

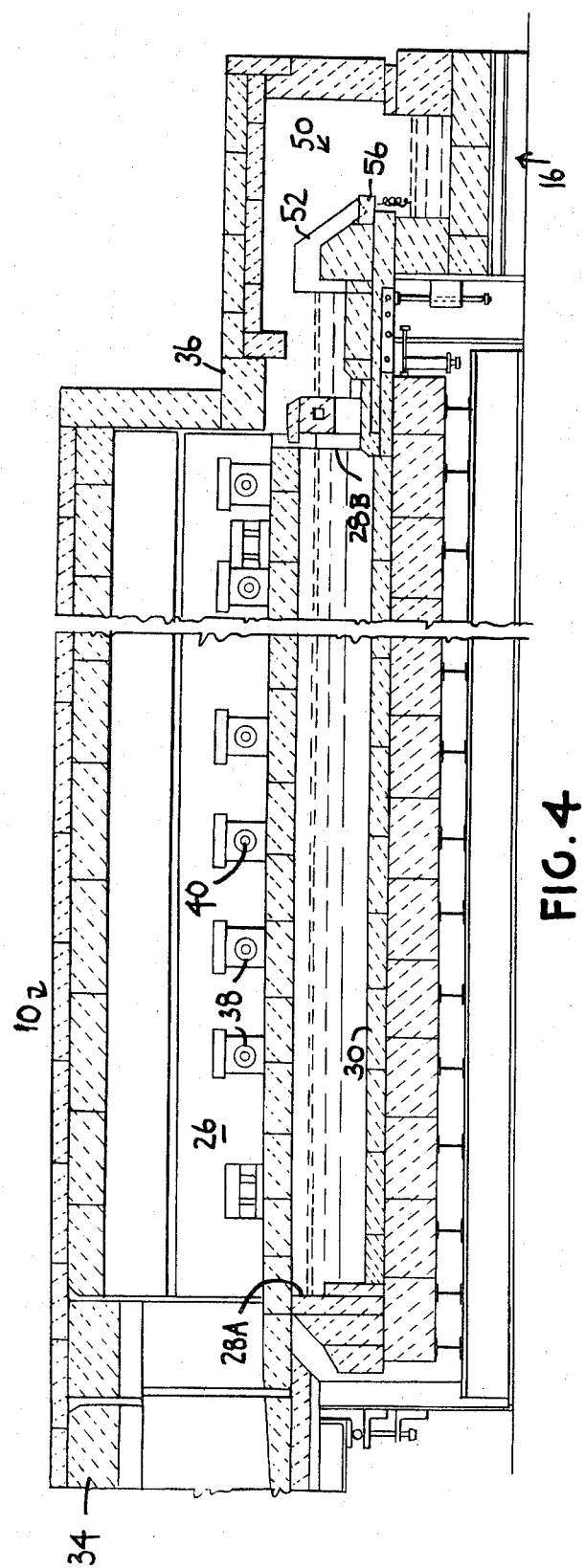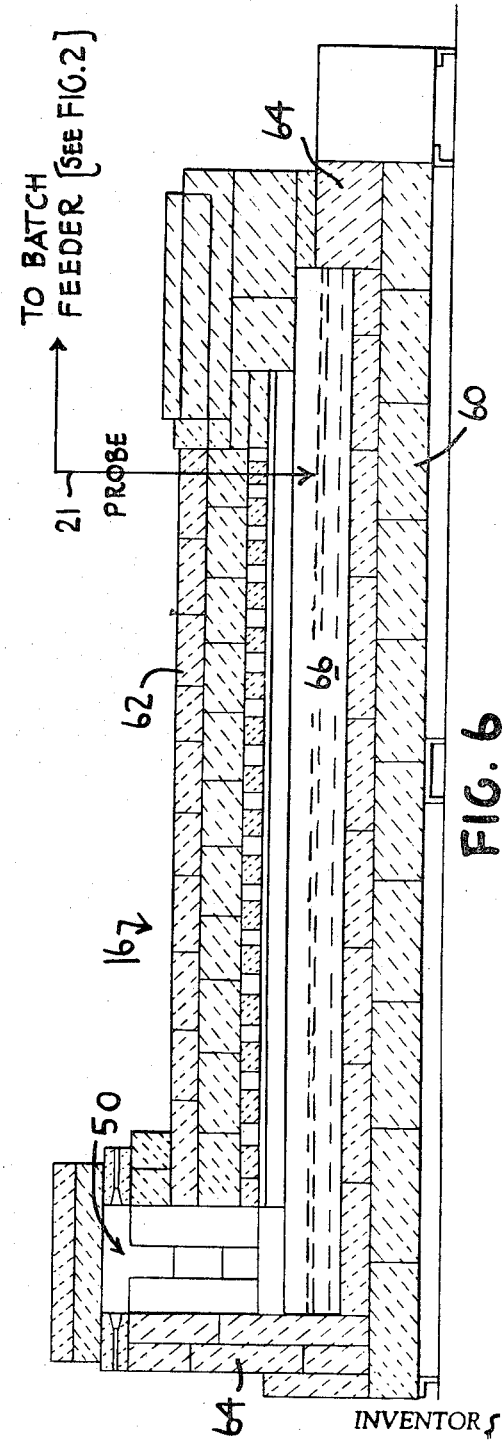

3,733,189
METHOD AND APPARATUS FOR FORMING GLASS FIBERS
George B. Zurheide, Upper St. Clair, Pa., and Robert G. Shealy, Shelby, N.C., assignors to PPG Industries, Inc., Pittsburgh, Pa.
Continuation of abandoned application Ser. No. 729,044, May 14, 1968. This application Mar. 10, 1971, Ser. No. 123,022
Int. Cl. C03b 37/02, 5/16
U.S. Cl. 65—11 R                9 Claims

ABSTRACT OF THE DISCLOSURE

Apparatus for manufacturing fiber glass includes a recuperator glass melter, a refiner and a forehearth. The stack for discharge of hot gases is spaced from the melter, providing a relatively long path for the hot gases. The refiner is separate from the melter and is relatively long and narrow, insuring substantially plug-flow therethrough. Molten glass from the melter is fed as a relatively thin stream over an inclined trough, so that it is exposed to the atmosphere thereabove and into a container with an opening therein through which the glass falls, as a spiraling stream onto any glass in the refiner. The refiner may be perpendicular to the center line of the melter. The glass flows from the refiner into a canal and then into a T-shaped forehearth which tapers in width from the canal to the ends to insure substantially uniform velocity of the glass from entry to terminal end thereof. The depth of the forehearth, which is well insulated to reduce heat loss therefrom is substantially uniform along its length. The forehearth contains, in its bottom walls, a plurality of fiber forming bushings having orifices through which streams of glass flow to be attenuated into fibers.

BACKGROUND OF THE INVENTION

This application is a continuation of Ser. No. 729,044, filed May 14, 1968 now abandoned.

In the manufacture of glass fibers, glass making ingredients are fed into a tank in which they are reduced to molten condition by means of heat produced by burning fuel, such as natural gas and heated combustion air, and the molten glass is refined in the same tank, with perhaps the melting and refining ends being separated by throats or the like. In such a tank, there are natural convection currents, so that the residence time of some increments of glass is greater than other increments thereof. This means that some glass is more homogeneous than other portions; thus the quality of the final product can vary. The molten glass generally flows from the tank through a canal into a forehearth which may be of a T-shape. Each forehearth includes a number of fiber forming bushings therein, as for example 40 or more, so that when T-shaped, each leg will include 20 or more bushings. Generally such forehearths have been uniform in section, from one end to the other, so that the velocity of the glass over the bushings and perhaps the head of glass over each bushing will vary. Thus the pull of each bushing even when the orifices are the same may vary along the length of the forehearth. One prior method of attempting to equalize the head of glass over the bushings was to slope the forehearth, so that the terminal ends were below the glass entrance location. This has not proved successful.

In order to maintain the proper temperature in the forehearth, the glass has been heated therein. This practice has shortened the life of the refractories and has caused unequal glass temperatures in the bushings, requiring various heating schemes to be practiced.

SUMMARY OF THE INVENTION

According to this invention, apparatus for producing glass fibers is constructed in such a manner to insure homogeneous glass to the fiber-forming bushings in the forehearth. The apparatus includes a melting tank to which glass making ingredients are supplied and which is gas fired, combustion air for the gas burners being preheated by a recuperator. The stack for the melter is joined to but spaced from one end thereof, so as to provide a relatively long insulated path for the hot products of combustion, it having been found that recuperator or stack life can be materially increased by such placement and that a minimum quantity of heat is dissipated prior to exhaust yet maintaining high combustion air preheat. The arrangement of melter and stack as will become apparent is such to facilitate rebuild of and replacement of a melter, when necessary. A vertical water-cooled metal shut-off damper is positioned to be dropped in place during an emergency.

The melter is constructed to only melt the glass making ingredients and, unlike conventional fiber forming tanks, does not include provisions for refining glass. Instead, a separate refiner is connected to the tank, the refiner, according to this invention, being relatively long and narrow. The width is much less than the width of the melter. Molten glass delivered to the refiner flows from its delivery end to its discharge end without substantial recirculation. There are few, if any, convection currents in the glass in the refiner. The molten glass therein exhibits what is known in the glass making art as "plug-flow."

A novel delivery arrangement is provided to supply molten glass from the melter to the refiner, the glass surface of the refiner being substantially lower than the glass surface in the melter. Molten glass flows over a relatively narrow trough containing a weir, the width of which is much less than that of the melter or the refiner, and as a relatively thin stream such that it is exposed to the atmosphere thereabove. It is surmised that a rolling action occurs, so that gases therein are released to the atmosphere. The glass from the trough flows into a container which may be referred to herein as a free-fall homogenizer which has an opening in its bottom wall. The bottom wall of the container is located above the level of molten glass in the refiner, so that molten glass flows through the opening and follows a spiral path onto the glass therebelow. The glass flow over the trough and through the container opening in a spiral path insures homogeneous glass to the refiner. It also avoids any counter flow-back into the melter.

The refiner is connected by a canal to a T-shaped forehearth in which the fiber forming bushings are located. Unlike the conventional forehearth, the forehearth of this invention tapers or converges from the canal to its terminal ends with a substantially uniform depth and thus glass level, such that the velocity of glass delivered thereto remains substantially the same from its entry to the end of the forehearth. Also, the forehearth is well insulated and little additional heat is required to maintain the molten glass at the proper drawing temperature.

As will be apparent from the description to follow, especially when considered with the drawings, the physical arrangement of the various parts of the apparatus lend themselves to replacement without undue interruption of the process. This is especially true of the offset tank arrangement.

Generally, a melting tank is completely torn down at the end of a campaign and is then rebuilt. Several weeks are required for the rebuild and during this interval of time, all production is lost for those bushings in the forehearth. With the arrangement here, the downtime is materially reduced. Because of the offset tank arrangement, another tank can be built, a mirror image of the one to be torn down, and the only connections to be made are at the stack and into the canal. The canal and forehearth usually have longer life than the melter and refiner. The total down-time can be less than one week by this arrangement.

The drawings:

In order to more fully explain the invention, reference is now made to the drawings, in which FIG. 1 is a general plan view of the arrangement for producing glass fibers;

FIG. 2 is a partial horizontal section through the arrangement of FIG. 1;

FIG. 3 is a vertical section taken along line 3—3 of FIG. 2;

FIG. 4 is a vertical section taken along line 4—4 of FIG. 2;

FIG. 6 is a vertical section taken along line 4—4 of FIG. 2A;

Figure 2A:
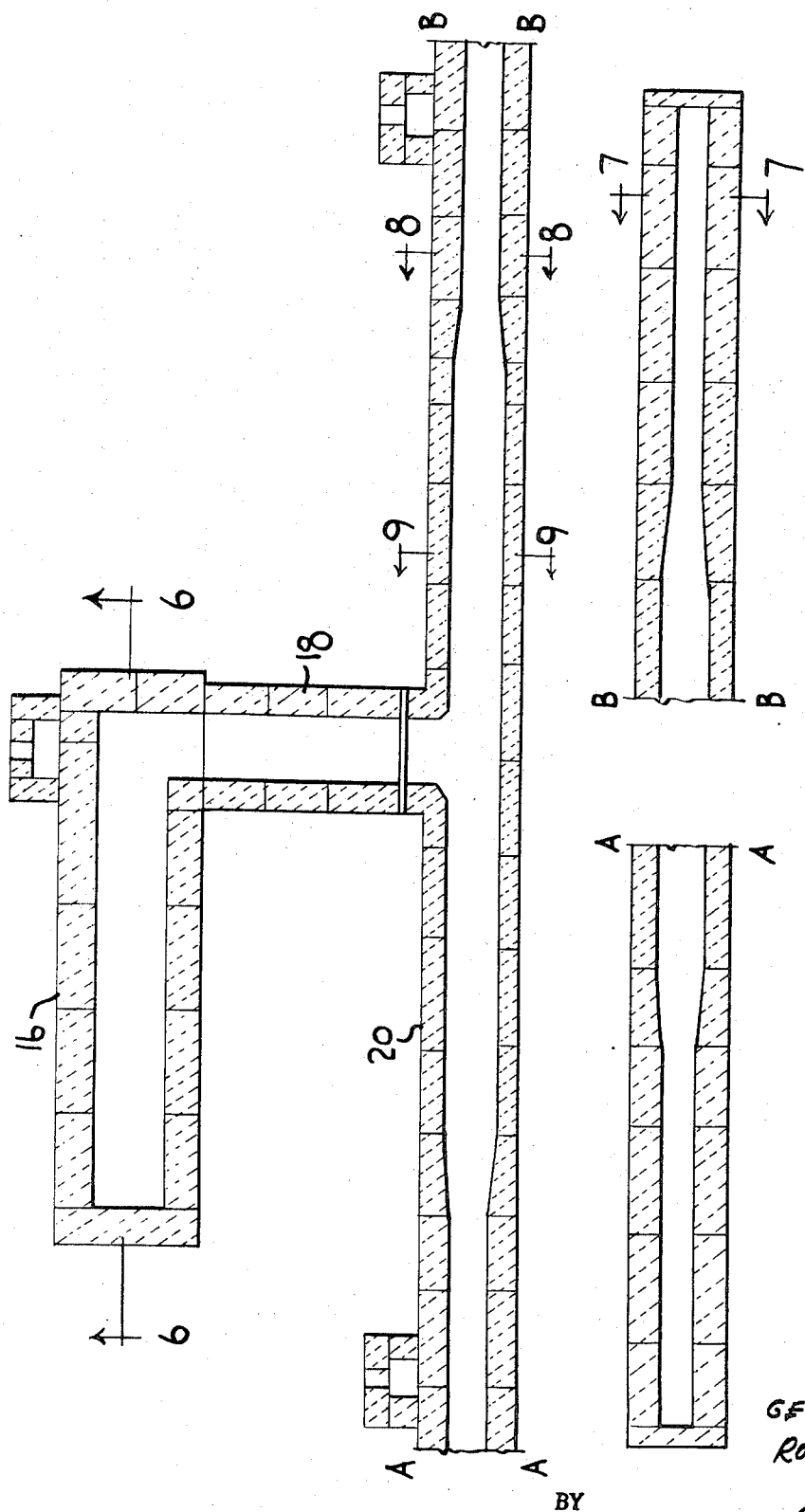
FIG. 2A is a horizontal section through the refiner, canal and forehearth.
Figure 7:
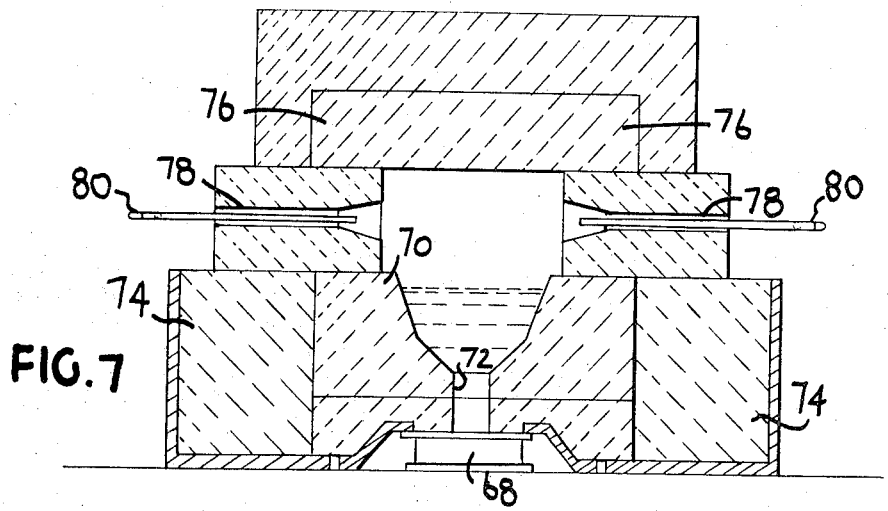
Figure 8:
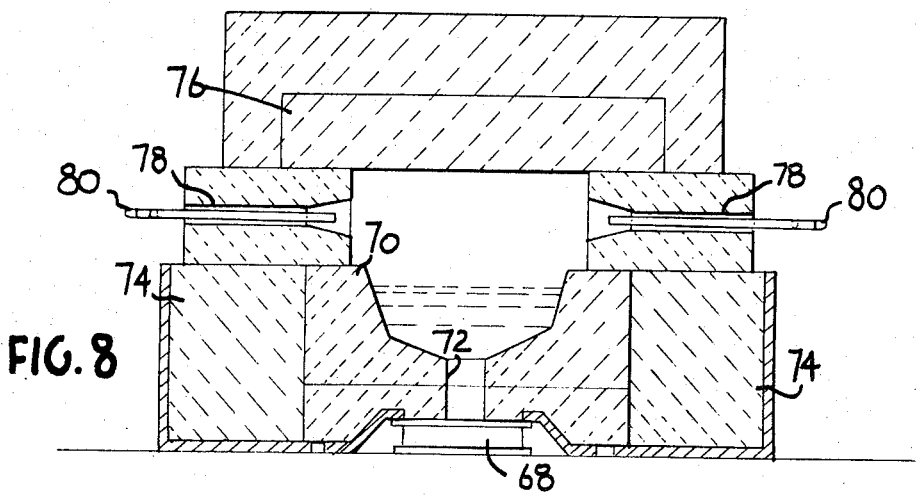
Figure 9:
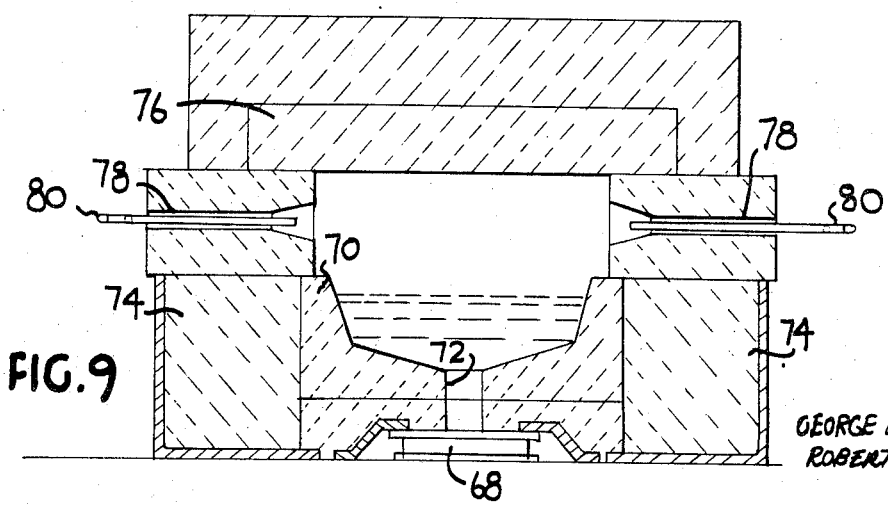
Figure 10:
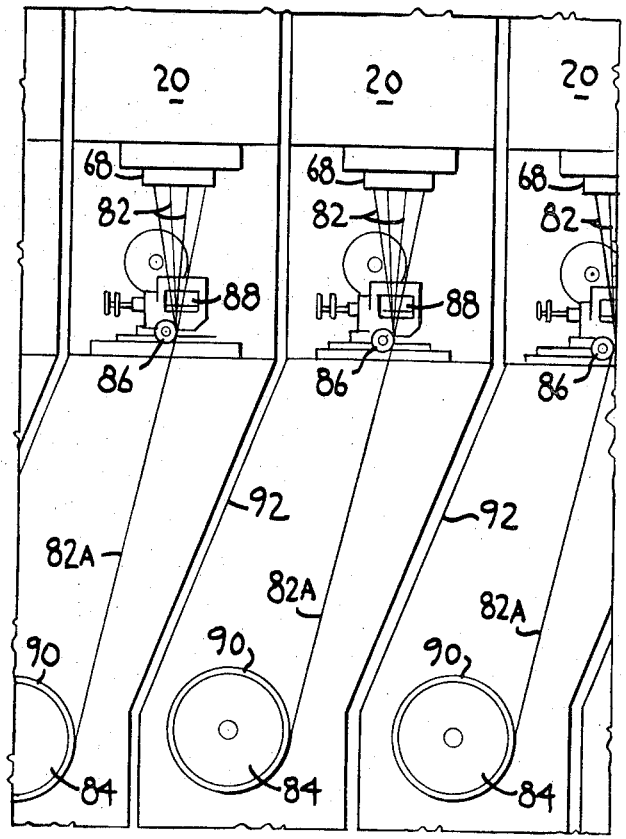

FIGS. 7, 8 and 9 are vertical sections taken along lines 7—7, 8—8 and 9—9, respectively, of FIG. 2A; and FIG. 10 is a general elevation of a fiber forming operation.

THE SPECIFIC EMBODIMENT

Figure 1:
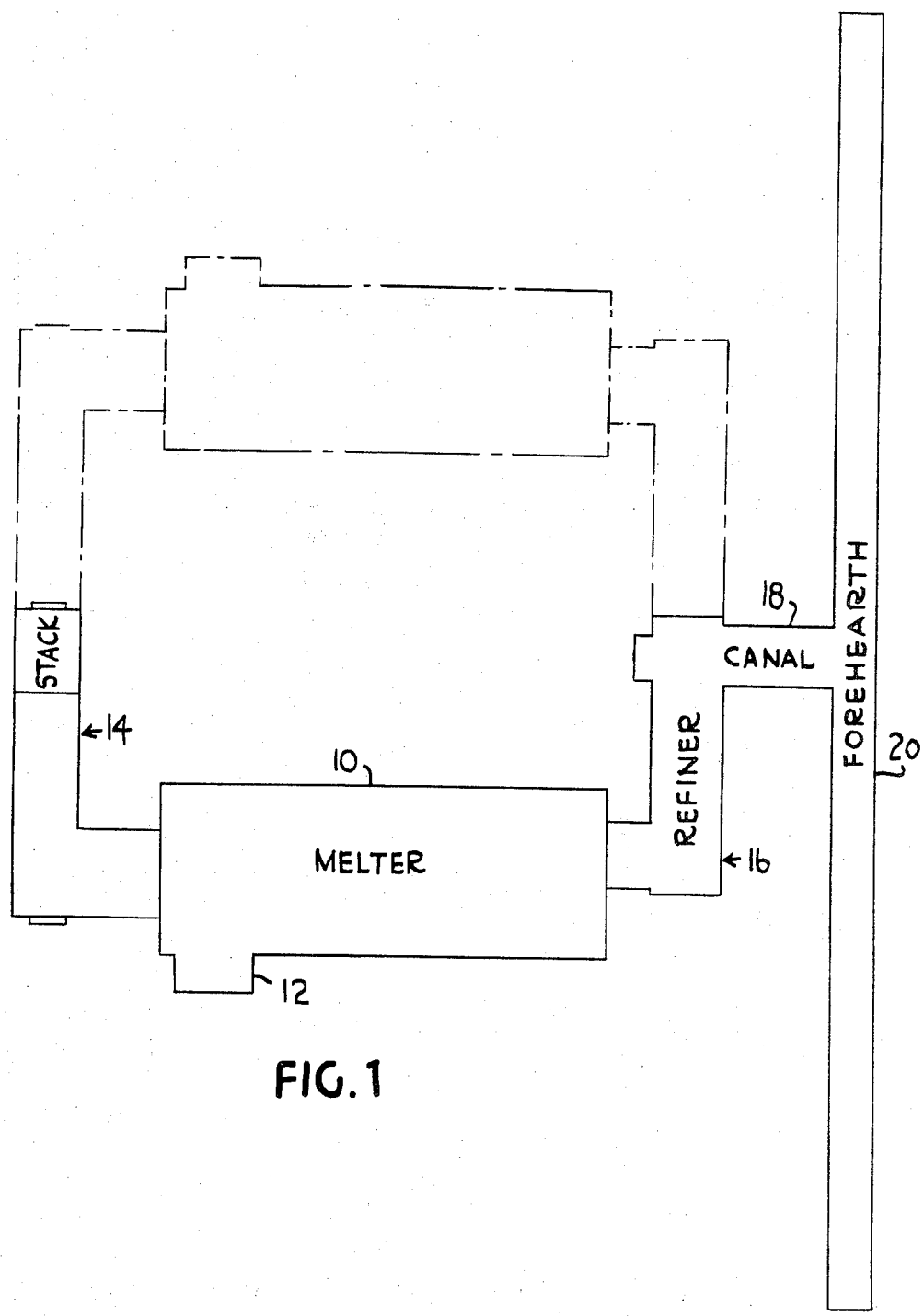

Reference is now made to FIG. 1 of the drawings, showing in plan, the general arrangement of the fiber forming apparatus according to this invention. There is shown the tank, furnace or melter 10 having a feeding doghouse 12 to which glass making ingredients or batch is fed in any conventional way, as for example a twin screw feeder 13, a stack arrangement 14 at the feeding end of the melter 10, a refiner 16 at the opposite end of the melter 10, a canal 18 connected to the refiner 16 and a T-shaped forehearth 20 connected to the canal 18. A level probe 21 in the refiner controls the batch feeder.

The arrangement of the various units facilitates rebuild of the tank, refiner and stack connection or brick work in that a mirror image arrangement can be constucted, as depicted in the broken lines, without interrupting the existing arrangement. Only two connections must be made to connect the new tank to the stack and the canal. This arrangement can materially reduce downtime of the apparatus.

FIGS. 2 and 4 are sectional views of the melter 10 and a tunnel 22 having a vertical water-cooled metal shutoff or damper 23 therein connecting the melter 10 to the stack 24. The melter 10 is constructed of a pluarily of clay refractory blocks 25 with side walls 26, end walls 28A and 28B, a bottom 30 and a roof 32. The end wall 28B is air cooled for glass temperature control purposes.

The end wall 28A is connected by a passageway 34, of clay refractory blocks, to the tunnel 22 which is also constructed of clay refractory blocks. The stack 24 is similarly constructed (see also FIG. 3). The opposite end wall 28B is joined to the refiner 16 by a tunnel-like construction 36 which has therein a lip and feeding arrangement to be later described.

The side walls 26 of the melter 10 are provided with a plurality of spaced ports 38 suitably constructed of clay refractory members. The ports 38 are positioned above the glass level and each receives a fuel burner 40. Combustible gas is fed by a suitable conduit 42 from a source (not shown) to each burner. Preheated combustion air is fed to each burner 40 by a suitable conduit 44. A conventional recuperator is located above the stack 24 and is constructed such to preheat air for combusion which is delivered to the burners 40 through the conduits 44.

Ports, burners, etc., are located at each side of the melter 10. Fuel oil can be subsituted for the combustible gas if necessary or desirable. Additional details of the stack arrangement 14 can be seen in FIG. 3.

Figure 5:
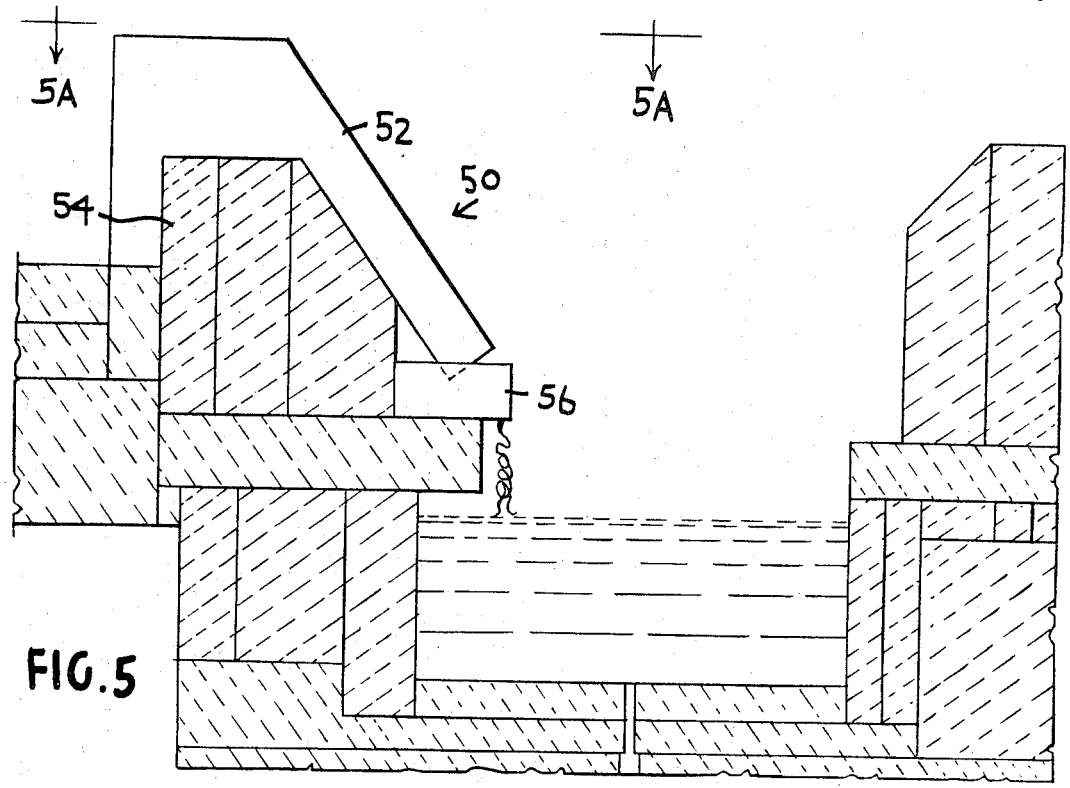
FIG. 5 is an enlarged view of the spout and container feeding arrangement for delivering molten glass from the melter to the refiner.
Figure 5A:
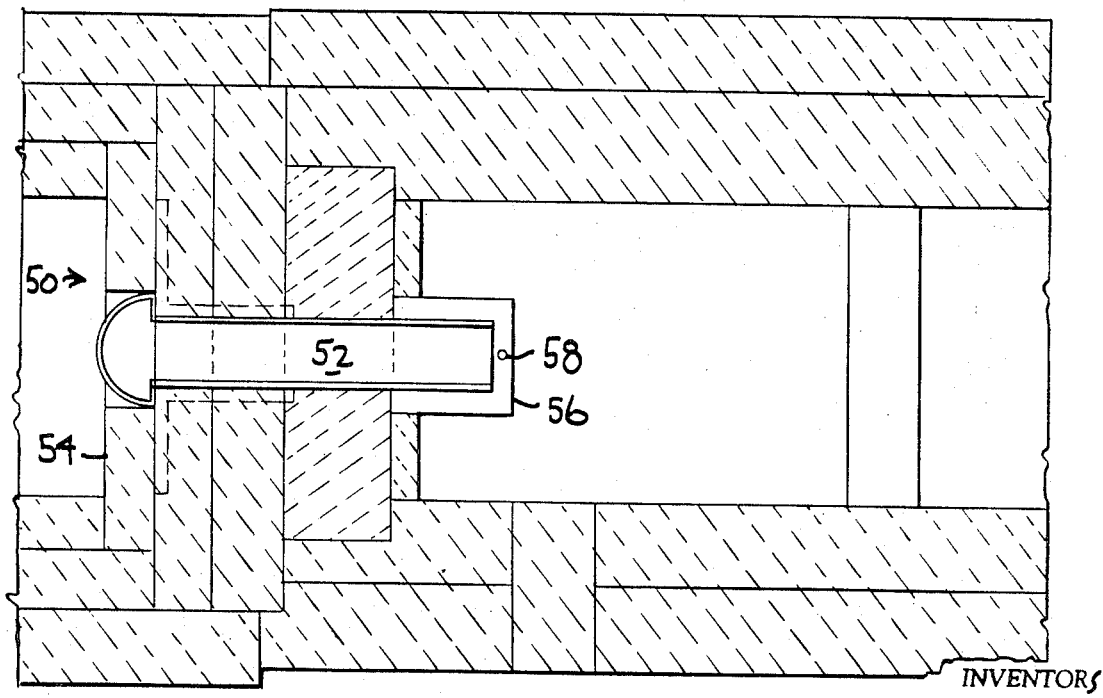
FIG. 5A is an enlarged view taken along line 5A—5A of FIG. 5.

The lip and feeding arrangement, generally identified by the reference character 50 joins the melter 10 and the refiner 16 and is best illustrated in FIGS. 4, 5 and 5A. This arrangement includes a trough or weir 52 constructed of platinum which is attached to the end wall 54 of the melter 10. The trough or weir 52, as can be seen in FIG. 5A is relatively shallow and narrow, such that a relatively thin stream of molten glass from the melter 10 flows thereover, probably with a rolling action and exposed to the atmosphere thereover. The molten glass flows from the trough or weir 52 into a relatively small pan 56 having an opening 58 in its bottom wall. The pan 56 is preferably constructed of platinum. The molten glass forms a spiraling stream from the opening 58 onto the glass in the refiner 16. The exposure of the glass to the atmosphere and its rolling motion down the trough with the spiraling stream assist in refining the glass by eliminating gases therein. The flow through the weir is controlled by the probing-type level controller 21 located in the refiner and controls the rate of batch feeding.

The refiner 16, see especially FIG. 6, is constructed of clay refractory blocks and includes a bottom 60, a roof 62, end walls 64 and side walls 66.

In the refiner 16, there is a plug-flow of glass to the canal 18 and then into the forehearth 20. The canal 18 is also constructed of clay refractory blocks with a roof, bottom and side walls. The forehearth 20 and the canal 18 generally form a T, see FIG. 2A. As previously stated, there is a plurality of fiber forming bushings 68 (see FIGS. 7 to 9 and 10) in the bottom of the forehearth. The forehearth 20 of the arrangement being described is substantially uniform in depth throughout its length and is constructed of a plurality of refractory blocks, so as to have a bottom 70 spaced to provide a receptacle for molten glass which is narrower at its terminal ends than at its center. Spaced openings 72 communicate the receptacle to the bushings 68. Additional refractory material 72 flanks the shaped refractory 70 in order to insulate the forehearth. A roof structure 76 and burner ports 78 are provided. In order to maintain the glass in the forehearth at proper temperature some heat may be provided by burners 80 located in the ports 78. These burners 80 are suitably provided with a combustible gas mixture from a source (not shown).

Attention is directed to FIG. 10 which shows, generally, a series of fiber forming positions, the forehearth being identified by the reference character 20 with a series of fiber forming bushings 68 therein.

Glass flows through openings in the bushing (there may be several hundred openings in a bushing) and the resulting streams are attenuated into fibers 82 by means of a winder 84 onto which the fibers are collected. The fibers 82 are grouped together to form a strand 82A by a guide 86 and just prior thereto are engaged by a binder applicator 88 which applies a binder thereto.

The winder 84 is a driven drum which receives a tube 90 onto which the strand 82A is collected as a forming package. Position shields 92 separate the various fiber forming positions.

Throughout the drawings, the glass level has been indicated by dashed lines and controlled by a probing-type controller located in the refiner and controls the rate of batch into the melter.

Thus there has been described an arrangement for producing glass fibers. The scope of the invention is described in the appended claims.

We claim:

1. Apparatus for producing glass fibers comprising,
   a tank for melting glass-making materials fed thereto,
   means for feeding said glass-making materials to said tank, means to supply sufficient heat to said tank to melt said glass-making materials, a relatively long and narrow refiner, whose width is much less than the width of said tank in order to assist plug flow within said refiner, for refining molten glass fed thereto from said tank, and a forehearth having fiber forming bushings therein connected to said refiner into which molten glass flows from said refiner and is removed from said bushings as stream to be formed into fibers, said forehearth being constructed so that it narrows in width from the refiner to its terminal end such that a uniform glass level is maintained therein until it is removed from said bushings.

2. Apparatus as recited in claim 1 further including, means for maintaining constant the direction of flow of molten glass from said tank to said refiner.

3. Apparatus as recited in claim 1 further including, means for feeding molten glass from said tank to said refiner, said feeding means maintaining constant the direction of flow of the molten glass from said tank to said refiner.

4. Apparatus for producing glass fibers comprising, a tank for melting glass-making materials fed thereto, means for feeding said glass-making materials to said tank, means to supply sufficient heat to said tank to melt said glass-making materials, a relatively long and narrow refiner, whose width is much less than the width of said tank in order to assist plug flow within said refiner, for refining molten glass fed thereto from said tank, means for feeding molten glass from said tank to said refiner including a sloped open-topped trough positioned to receive molten glass from said tank and to discharge molten glass from the lower terminal end thereof positioned within said refiner, and a container at said trough end to receive molten glass flowing down said trough, said container having an opening therethrough through which molten glass received therein flows into said refiner and onto any glass therein, and a forehearth having fiber forming bushings therein connected to said refiner into which molten glass flows from said refiner and is removed from said bushings as streams to be formed into fibers, said forehearth being constructed so that it narrows in width from the refiner to its terminal end such that a uniform glass level is maintained therein until its removal.

5. The apparatus of claim 1 including a stack for discharge of hot gases from said tank, said stack being connected to and spaced from one side of said tank and having means for connecting said stack to a second tank.

6. The apparatus of claim 5 wherein said heat means includes fuel burners and further including a recuperator associated with said stack for preheating combustion air for said fuel burners.

7. Apparatus as recited in claim 4 wherein said refiner is separated from said tank and is positioned substantially perpendicular to the center line of said tank.

8. Apparatus as recited in claim 4 further including, a canal joining said refiner and said forehearth which canal is positioned substantially perpendicular to said refiner.

9. In apparatus for forming glass fibers at a plurality of fiber forming stations which comprises a melting tank, a forehearth having an inlet for molten glass flowing from said melting tank and means for supplying molten glass from said melting tank to said forehearth through said inlet, said forehearth containing a plurality of bushings therein for delivery of molten streams of glass for attenuation into fibers, the improvement which comprises a forehearth which narrows in width from glass entry location to its terminal end such that a uniform glass level is maintained therein to a plurality of glass fiber forming stations.

References Cited

UNITED STATES PATENTS

| 2,465,283 | 3/1949 | Schlehr | 65—1 |
| 3,057,175 | 10/1962 | Rough et al. | 65—346 X |
| 3,142,551 | 7/1964 | Wranau | 65—126 X |
| 3,406,021 | 10/1968 | Day et al. | 65—1 |

ROBERT L. LINDSAY, JR., Primary Examiner

U.S. Cl. X.R.

65—135, 136, 145, 341, 346, 356